US012711060B2

(12) United States Patent
Wei et al.

(10) Patent No.: US 12,711,060 B2
(45) Date of Patent: Aug. 18, 2026

(54) MEMORY DEVICES, OPERATING METHODS AND MEMORY SYSTEMS FOR MANAGING BAD MEMORY BLOCKS

(71) Applicant: Yangtze Memory Technologies Co., Ltd., Wuhan (CN)

(72) Inventors: Jing Wei, Wuhan (CN); Chong Jin, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/912,283

(22) Filed: Oct. 10, 2024

(65) Prior Publication Data

US 2025/0355799 A1 Nov. 20, 2025

(30) Foreign Application Priority Data

May 14, 2024 (CN) ......................... 202410599456.8

(51) Int. Cl.
*G06F 12/00* (2006.01)
*G06F 12/02* (2006.01)

(52) U.S. Cl.
CPC ................................ *G06F 12/0246* (2013.01)

(58) Field of Classification Search
CPC .. G06F 12/0246; G06F 3/0659; G06F 3/0673; G11C 11/40622
USPC .......................................................... 711/103
See application file for complete search history.

(56) References Cited

U.S. PATENT DOCUMENTS

2014/0189226 A1* 7/2014 Seo .................. G11C 11/40622 711/105
2016/0357462 A1* 12/2016 Nam .................... G06F 3/0613
2020/0135283 A1* 4/2020 Park ..................... G06F 3/0604
2021/0026766 A1* 1/2021 You ........................ G06F 9/546

FOREIGN PATENT DOCUMENTS

SU 888120 A1 * 12/1981

* cited by examiner

*Primary Examiner* — Mardochee Chery
(74) *Attorney, Agent, or Firm* — Hanley, Flight & Zimmerman, LLC

(57) ABSTRACT

Examples of the present application disclose memory devices, operating methods of memory devices, and memory systems. An example memory device includes: a memory cell array including: a first memory block; and a peripheral circuit coupled with the first memory block and configured to: receive a first block address information of the first memory block; determine whether the first memory block is a bad block according to the first block address information; generate a first indication signal in response to the first memory block being determined as the bad block; and stop activation of the first memory block pointed to by the first block address information in response to the first indication signal.

20 Claims, 13 Drawing Sheets

MEMORY DEVICES, OPERATING METHODS AND MEMORY SYSTEMS FOR MANAGING BAD MEMORY BLOCKS

CROSS-REFERENCE TO RELATED APPLICATIONS

This application claims priority to and the benefit of Chinese Patent Application 202410599456.8, filed on May 14, 2024, which is hereby incorporated by reference in its entirety.

TECHNICAL FIELD

The present application relates to the technical field of semiconductor memories, and particularly to memory devices, operating methods, and memory systems.

BACKGROUND

A memory device is a memory apparatus configured to save information in the modern information technology. As a typical non-volatile semiconductor memory, the NAND (Not-And) type memory gradually becomes a mainstream product in the storage market as it has a relatively-high memory density, controllable production costs, appropriate program and erase speeds, and retention characteristics.

BRIEF DESCRIPTION OF THE DRAWINGS

In the drawings not necessarily drawn to scale, the like numerals may describe similar components in different views. Like numerals with different letter suffixes may represent different examples of similar components. The drawings illustrate generally, by way of example, but not by way of limitation, various examples discussed in the present document.

DETAILED DESCRIPTION

Figure 1:
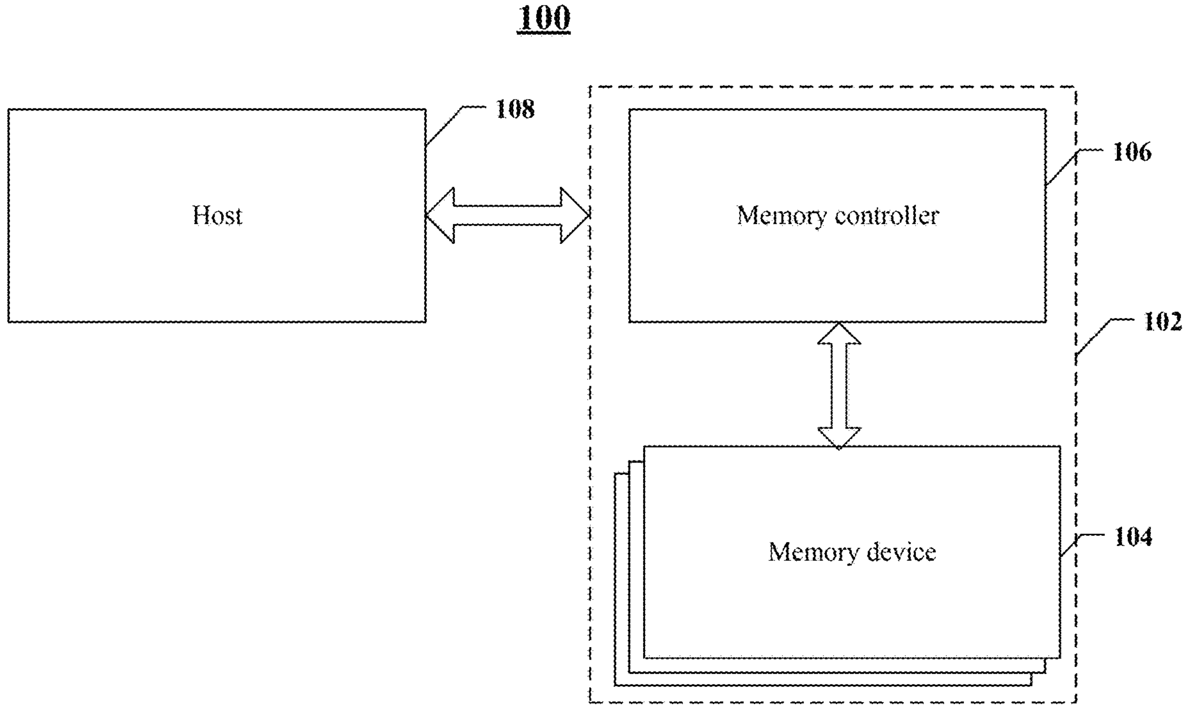
FIG. 1 is a block diagram of an example system having a memory system provided by examples of the present application.

Example implementations disclosed by the present application will be described below in more detail with reference to the drawings. Although example implementations of the present application are shown in the figures, it is to be understood that, the present application may be implemented in various ways without being limited by the specific implementations as set forth herein. On the contrary, these implementations are provided for more thorough understanding of the present application, and to fully convey the scope disclosed in the examples of the present application to a person skilled in the art.

In the following descriptions, a lot of specific details are given in order to provide a more thorough understanding of the present application. However, it is apparent to those skilled in the art that the present application may be carried out without one or more of these details. In other examples, in order to avoid confusion with the present application, some technical features well-known in the art are not described. That is, not all the features of the actual examples are described herein, and well-known functions and structures are not described in detail.

In the drawings, the sizes of a layer, a region, and an element and their relative sizes may be exaggerated for clarity. Like reference numerals denote like elements throughout.

It is to be understood that when an element or a layer is referred to as being "on", "adjacent to", "connected to", or "coupled to" other elements or layers, it may be directly on, adjacent to, connected to, or coupled to the other elements or layers, or one or more intervening elements or layers may be present. In contrast, when an element is referred to as being "directly on", "immediately adjacent to", "directly connected to", or "directly coupled to" other elements or layers, no intervening elements or layers are present. It is to be understood that, although the terms first, second, and third, etc., may be used to describe various elements, components, areas, layers and/or portions, these elements, components, areas, layers and/or portions should not be limited by these terms. These terms are only used to distinguish one element, component, area, layer or portion from another element, component, area, layer or portion. Therefore, without departing from the teaching of the present application, a first element, component, area, layer, or portion discussed below may be represented as a second element, component, area, layer, or portion. While the second element, component, area, layer, or portion is discussed, it does not mean that the first element, component, area, layer, or portion is necessarily existent in the present application.

Spatial relation terms, such as "beneath", "below", "lower", "under", "above", "upper" and the like, may be used herein for conveniently describing, thereby describing a relationship between one element or feature shown in the drawings and other elements or features. It should be understood that in addition to orientations shown in the drawings, the spatial relationship terms are intended to further include the different orientations of a device in use and operation. For example, if the device in the drawings is turned over, then the elements or the features described as "below" or "under" or "beneath" other elements may be oriented "on" the other elements or features. Therefore, the example terms "below" and "beneath" may include both upper and lower orientations. The device may be orientated otherwise (rotated by 90 degrees or in other orientations), and the spatial descriptive terms used herein are interpreted accordingly.

A purpose of the terms used here is only to describe the particular examples and not as a limitation to the present application. As used herein, unless otherwise indicated expressly in the context, "a", "an" and "the" in a singular form are also intended to include a plural form. It is also to be understood that terms "composed of" and/or "comprise", when used in this specification, determine the presence of described features, integers, steps, operations, elements and/or components, but do not preclude the presence or addition of one or more of other features, integers, steps, operations, elements, components, and/or groups. As used herein, a term "and/or" includes any and all combinations of listed relative items.

In order to understand the features and technical contents of the examples of the present application in more detail, the implementation of the examples of the present application are described in detail below with reference to the drawings, which are for reference only and are not intended to limit the examples of the present application.

It should be understood that "one example" and "an example" mentioned in the whole specification mean that specific features, structures or characteristics related to the example is included in at least one example of the present application. Therefore, "in one example" or "in an example" appearing at any place of the whole specification does not always refer to the same example. Furthermore, these particular features, structures, or characteristics may be incorporated in one or more examples in any suitable manner. It is to be understood that, in various examples of the present application, sequence numbers of the above processes do not indicate an execution order, and an execution order of various processes shall be determined by functionalities and intrinsic logics thereof, and shall constitute no limitation on an implementation process of the examples of the present application. The above sequence numbers of the examples of the present application are only for description, and do not represent advantages or disadvantages of the examples.

The methods disclosed in several method examples as provided by the present application may be combined freely to obtain new method examples in case of no conflicts.

Examples of the present application are further described in detail below with reference to the drawings and specific examples.

FIG. 1 illustrates a schematic diagram of an example system having a memory system provided by an example of the present application. In FIG. 1, the system 100 may be a mobile phone, a desktop computer, a laptop computer, a tablet computer, a vehicle computer, a gaming console, a printer, a positioning apparatus, a wearable electronic apparatus, a smart sensor, a virtual reality (VR) apparatus, an augmented reality (AR) apparatus, or any other suitable electronic apparatuses having memories therein. As shown in FIG. 1, the system 100 may include a host 108 and a memory system 102, wherein the memory system 102 has one or more memory devices 104 and a memory controller 106; and the host 108 may be a processor of an electronic apparatus, such as a central processing unit (CPU) or a system on chip (SOC), wherein the system on chip may be, for example, an application processor (AP). The host 108 may be configured to send or receive data to or from memory devices 104. In particular, the memory devices 104 may be any memory disclosed in the present application, for example, a phase change random access memory (PCRAM), a three-dimensional NAND flash, etc.

According to some implementations, the memory controller 106 is coupled to the memory devices 104 and the host 108, and configured to control the memory devices 104. The memory controller 106 can manage the data stored in the memory devices 104 and communicate with the host 108. In some examples, the memory controller 106 is designed for operating in a low duty-cycle environment such as Secure Digital (SD) cards, Compact Flash (CF) cards, Universal Serial Bus (USB) flash drives, or other media for use in electronic apparatuses in a low duty-cycle environment, such as personal computers, digital cameras, mobile phones, etc. In some examples, the memory controller 106 is designed for operating in a high duty-cycle environment such as Solid State Drives (SSDs) or embedded Multi-Media Cards (eMMCs), wherein the SSDs or the eMMCs are used as data memories for mobile apparatuses in a high duty-cycle environment, such as smartphones, tablet computers, laptop computers, etc., and enterprise memory arrays. The memory controller 106 may be configured to control the operations of the memory devices 104, such as read, erase, and program operations. The memory controller 106 may be further configured to manage various functions with respect to data stored or to be stored in the memory devices 104, including, but not limited to, bad block management, garbage collection, logical-to-physical address conversion, wear leveling, etc. In some implementations, the memory controller 106 is further configured to process error correction codes (ECCs) with respect to the data read from or written to the memory devices 104. The memory controller 106 may further perform any other suitable functions as well, for example, formatting the memory devices 104. The memory controller 106 may communicate with an external apparatus (e.g., the host 108) according to a particular communication protocol. For example, the memory controller 106 may communicate with the external apparatus through at least one of various interface protocols, such as a USB protocol, an MMC protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer Small Interface (SCSI) protocol, an Enhanced Small Disk Interface (ESDI) protocol, an Integrated Drive Electronics (IDE) protocol, a Firewire protocol, etc.

Figure 2:
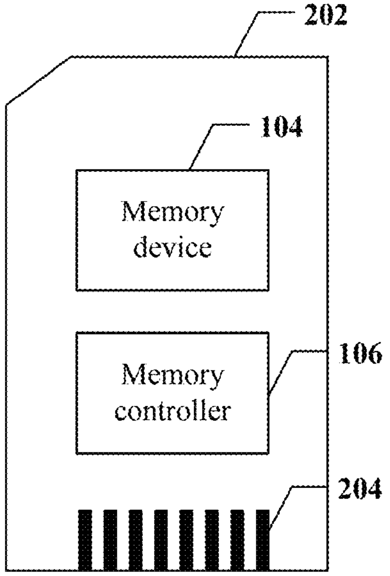
FIG. 2 is a block diagram of an example memory card having a memory system provided by examples of the present application.
Figure 3:
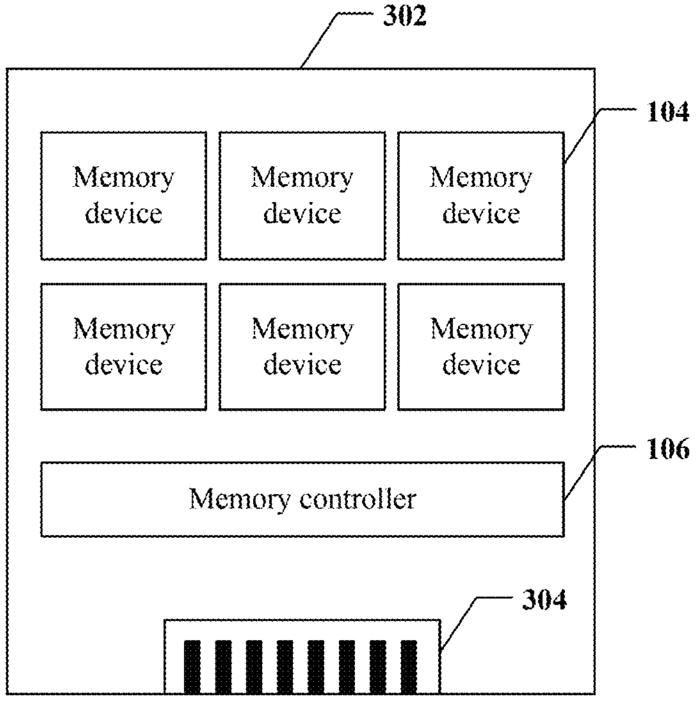
FIG. 3 is a schematic diagram of an example solid state drive having a memory system according to examples of the present application.

In some examples, the memory controller 106 and the one or more memory devices 104 may be integrated into various types of storage apparatuses, for example, being included in the same package (such as a universal flash storage (UFS) package or an eMMC package). That is, the memory system 102 may be implemented and packaged into different types of terminal electronic products. In one example as shown in FIG. 2, the memory controller 106 and a single memory device 104 may be integrated into a memory card 202. The memory card may include a PC card (personal computer memory card international association (PCMCIA)), a CF card, a smart media (SM) card, a memory stick, a multimedia card (MMC, RS-MMC, MMCmicro), an SD card (SD, miniSD, microSD, SDHC), a UFS, etc. The memory card may further include a memory card connector 204 coupling the memory card with a host (e.g., the host 108 in FIG. 1). In another example as shown in FIG. 3, the memory controller 106 and multiple memory devices 104 may be integrated into a solid state drive (SSD) 302. The SSD may further include an SSD connector 304 coupling the SSD with the host (e.g., the host 108 in FIG. 1). In some implementations, a storage capacity and/or an operating speed of the SSD are greater than a storage capacity and/or an operating speed of the memory card. Furthermore, the memory controller 106 may be further configured to control the erase, read and write operations of the memory devices 104.

Figure 4:
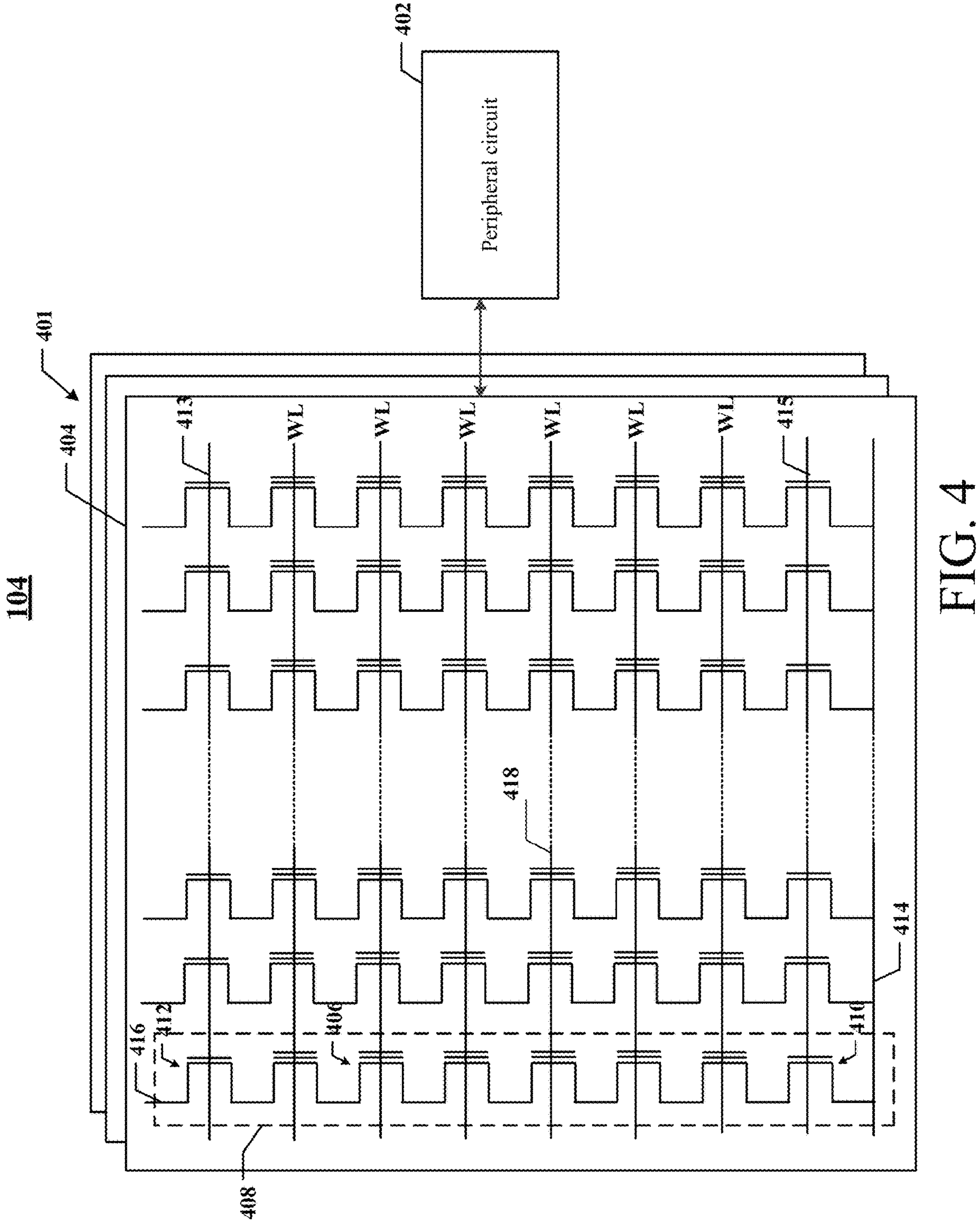
FIG. 4 is a schematic diagram of an example memory device including a peripheral circuit provided by examples of the present application.

As shown in FIG. 4, the memory device 104 may include a memory cell array 401 and a peripheral circuit 402 coupled to the memory cell array 401, wherein the memory cell array 401 may be a NAND flash memory array, wherein memory cells 406 are provided in an array of NAND memory strings 408, and each NAND memory string 408 extends vertically above a substrate (not shown). In some examples, each NAND memory string 408 includes the plurality of memory cells 406 coupled in series and stacked vertically. Each memory cell 406 may maintain a continuous analog value, such as a voltage or a charge, which depends on the number of electrons trapped within a memory area of the memory cell 406. Each memory cell 406 may be either a "floating gate" type memory cell that includes a floating gate transistor, or a "charge trap" type memory cell that includes a charge trap transistor.

In some examples, each memory cell 406 is a single level cell (SLC) that has two possible data states and thus may store one bit of data. For example, a first data state "0" may correspond to a first voltage range, and a second data state "1" may correspond to a second voltage range. In some examples, the first voltage range and the second voltage range may be referred to as threshold voltage distributions of the memory cells. In some examples, each memory cell 406 may be a multi level cell (MLC). For example, the MLC may store two bits per cell (which may also be referred to as a double level cell (DLC)), for another example, store three bits per cell (which may also be referred to as a trinary level cell (TLC)), for yet another example, store four bits per cell (which may also be referred to as a quadruple level cell (QLC)). The data states of the memory cells, regardless of types, all include one erase state and (one or more) program states. When a program operation is executed on the memory cell, the memory cell in the erase state is programmed to one program state. Generally, a voltage value within the voltage range corresponding to the program state of the memory cell is relatively large.

As shown in FIG. 4, each NAND memory string 408 may include a source selective gate (SSG) 410 at its source terminal and a drain selective gate (DSG) 412 at its drain terminal. The SSG 410 and the DSG 412 may be configured to activate the selected NAND memory strings 408 (a column of the array) during the read and program (or write) operations. In some examples, sources of the NAND memory strings 408 in a same memory block 404 are coupled through a same source line (SL) 414 (e.g., a common SL). In other words, according to some implementations, all the NAND memory strings 408 in the same memory block 404 have an array common source (ACS). According to some implementations, the DSG 412 of each NAND memory string 408 is coupled to a respective bit line 416 which the data can be read from and written to via an output bus (not shown). In some examples, each NAND memory string 408 is configured to be selected or unselected by applying a select voltage (e.g., above a threshold voltage of a transistor having the DSG 412) or an unselect voltage (e.g., 0 V) to the respective DSG 412 via one or more drain selective lines or top selective lines 413 and/or by applying a select voltage (e.g., above a threshold voltage of a transistor having the SSG 410) or an unselect voltage (e.g., 0 V) to the respective SSG 410 via one or more source selective lines or bottom selective lines 415.

As shown in FIG. 4, the NAND memory strings 408 can be organized into multiple memory blocks 404, each of the multiple memory blocks 404 may have a common source line 414, e.g., coupled to the ground. In some examples, each memory block 404 is a basic data unit for the erase operation, i.e., all of the memory cells 406 on the same memory block 404 are erased at the same time. In order to erase the memory cells 406 in a selected memory block 404, the source lines 414 coupled to the selected memory block 404 as well as unselected memory blocks 404 that are in a same plane as the selected memory block 404 may be biased with an erase voltage (Vers, such as a high positive voltage (e.g., 20 V or higher)). It is to be understood that, in some examples, the erase operation may be performed at a half memory block level, a quarter memory block level, or a level having any suitable number of memory blocks or any suitable fractions of a memory block. As shown in FIG. 4, the memory cells 406 of the adjacent NAND memory strings 408 may be coupled through word lines 418, that is to say, the same word line 418 may be coupled with the memory cells (i.e., corresponding memory cells) at a same position in the plurality of memory strings.

Figure 5:
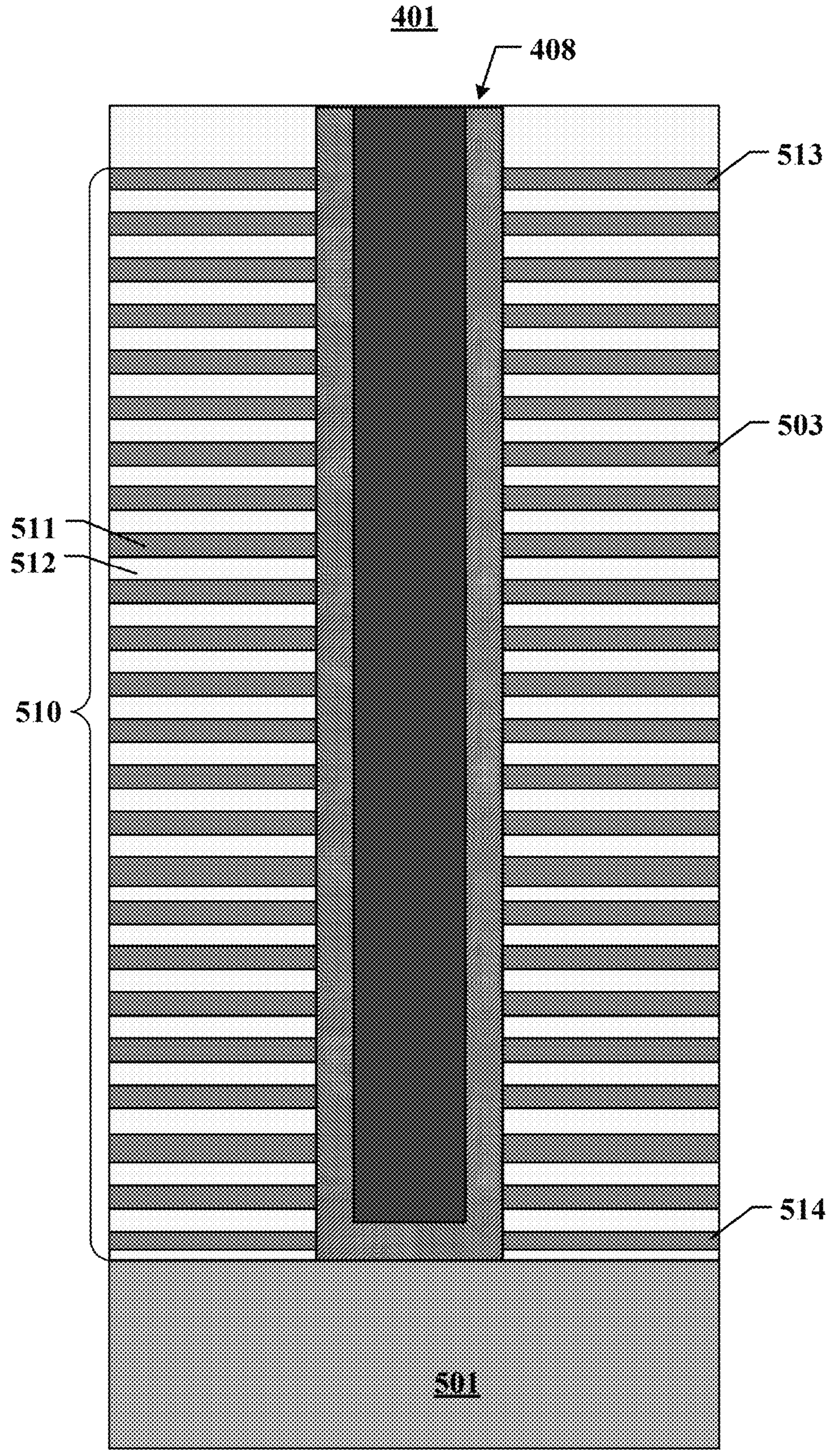
FIG. 5 is a schematic cross-sectional view of an example memory cell array including a NAND memory string provided by examples of the present application.

FIG. 5 shows a cross-sectional side view of an example memory cell array 401 including a NAND memory string 408 according to some aspects of the present application. As shown in FIG. 5, the NAND memory string 408 may include a stack structure 510. The stack structure 510 includes a plurality of gate layers 511 and a plurality of insulation layers 512, which are disposed as being sequentially and alternately stacked, and a memory string 408 vertically penetrating through the gate layers 511 and the insulation layers 512. The gate layers 511 and the insulation layers 512 may be alternately stacked, and two adjacent gate layers 511 are spaced apart by one insulation layer 512. The number of pairs of the gate layers 511 and the insulation layers 512 in the stack structure 510 may determine the number of memory cells included in the memory cell array 401.

A constituent material of the gate layers 511 may include a conductive material. The conductive material includes, but is not limited to, tungsten (W), cobalt (Co), copper (Cu), aluminum (Al), polysilicon, doped silicon, silicides, or any combination thereof. In some implementations, each gate layer 511 includes a metal layer, e.g., a tungsten layer. In some implementations, each gate layer 511 includes a doped polysilicon layer. Each gate layer 511 may include a control gate around the memory cells. The gate layer 511 at the top of the stack structure 510 may laterally extend as a upper selective gate line 513, i.e. a drain selective line or a top selective line 413, wherein the upper selective gate line 513 is a lead-out line of the drain selective gate (TSG) 412 described above, so as to being input with a respective select voltage or unselect voltage. The gate layer 511 at the bottom of the stack structure 510 may laterally extend as a lower selective gate line 514, i.e. a source selective line or a bottom selective line 415, wherein the lower select gate line 514 is a lead-out line of the source selective gate (BSG) 410 described above, so as to being in a respective select voltage or unselect voltage. The gate layers 511 laterally extending between the upper selective gate line and the lower select gate line may be used as word line layers 503, and these word line layers 503 are the word lines 418 described above.

In some examples, the stack structure 510 may be disposed on a substrate 501. The substrate 501 may include silicon (e.g., monocrystalline silicon), silicon germanium (SiGe), gallium arsenide (GaAs), germanium (Ge), silicon on insulator (SOI), germanium on insulator (GOI), or any other suitable materials.

In some examples, the NAND memory string 408 includes a channel structure (i.e., a channel hole, CH) that extends through the stack structure 510 vertically. In some implementations, the channel structure includes a channel hole filled with (one or more) semiconductor materials (e.g., as a semiconductor channel) and (one or more) dielectric materials (e.g., as a memory film). In some implementations, the semiconductor channel includes silicon, e.g., polysilicon. In some implementations, the memory film is a composite dielectric layer including a tunneling layer, a storage layer (also referred to as a "charge trap/storage layer"), and a blocking layer. The channel structure may have a cylindrical shape (e.g., a pillar shape). According to some implementations, the semiconductor channel, the tunneling layer, the storage layer, and the blocking layer are arranged radially from the center toward the outer surface of the pillar in this order. The tunneling layer may include silicon oxide, silicon oxynitride, or any combination thereof. The storage layer may include silicon nitride, silicon oxynitride, or any combination thereof. The blocking layer may include silicon oxide, silicon oxynitride, a high dielectric constant (high-k) dielectric, or any combination thereof. In an example, the memory film may include a composite layer of silicon oxide/silicon oxynitride/silicon oxide (ONO).

Figure 6:
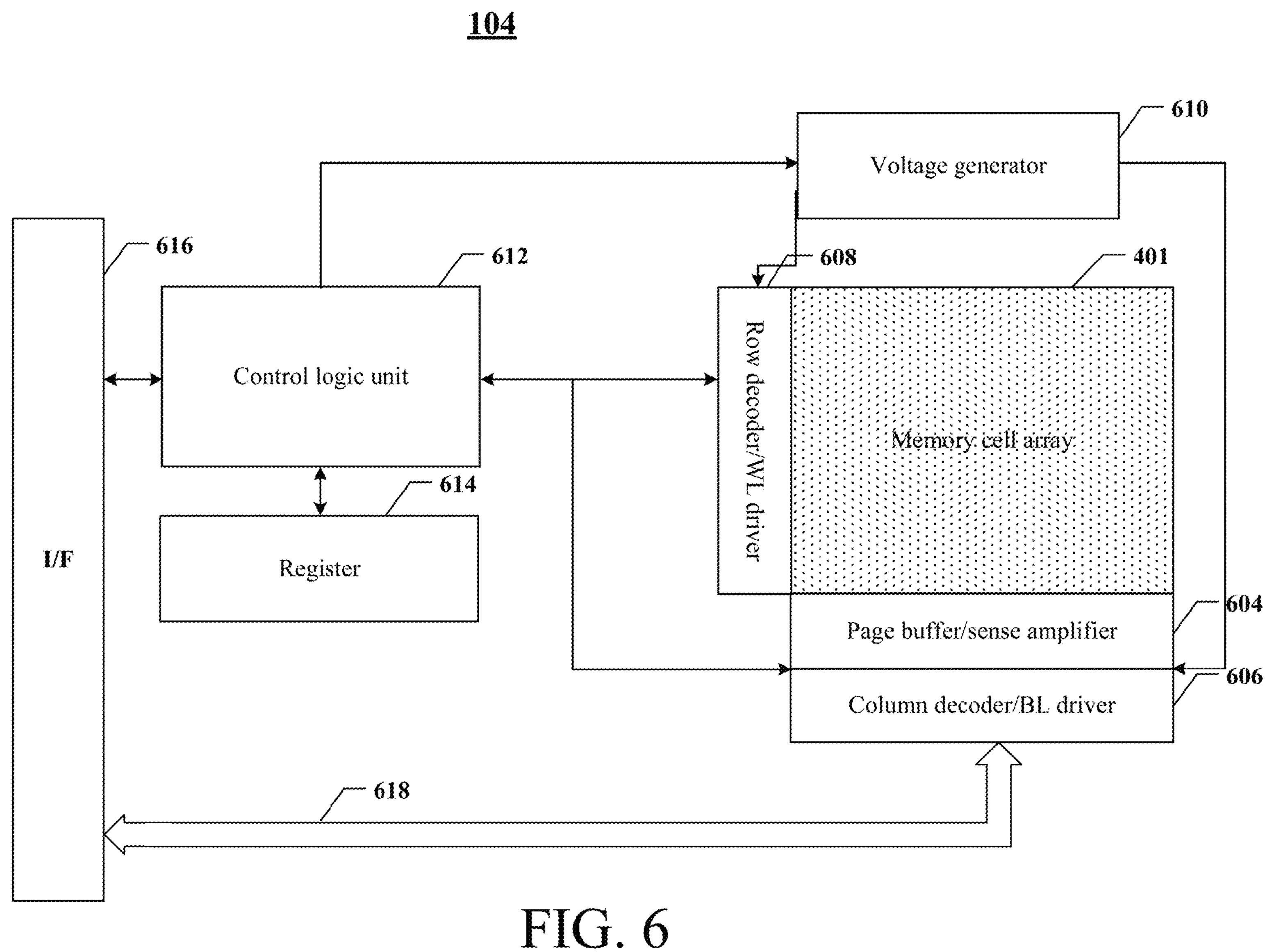
FIG. 6 is a schematic structural diagram of a peripheral circuit of a memory device provided by examples of the present application.

Referring back to FIG. 4, the peripheral circuit 402 may be coupled to the memory cell array 401 through the bit lines 416, the word lines 418, the source lines 414, the SSG lines 415, and the DSG lines 413. The peripheral circuit 402 may include any suitable analog, digital, and hybrid signal circuits for promoting operations of the memory cell array 401 by applying and sensing voltage signals and/or current signals to and from each target memory cell 406 via the bit lines 416, the word lines 418, the source lines 414, the SSG lines 415, and the DSG lines 413. The peripheral circuit 402 may include various types of peripheral circuits formed with a metal-oxide-semiconductor (MOS) technology. For example, FIG. 6 shows some example peripheral circuits. The peripheral circuit 402 may include a page buffer/sense amplifier 604, a column decoder/bit line driver 606, a row decoder/word line driver 608, a voltage generator 610, a control logic unit 612, a register 614, an interface 616, and a data bus 618. It is to be understood that, in some examples, additional circuits not shown in FIG. 6 may also be included as well.

In particular, the page buffer/sense amplifier 604 may be configured to read and program (write) data from and to the memory cell array 401 according to a control signal from the control logic unit 612. In one example, the page buffer/sense amplifier 604 may store program data (or referred to as write data) to be programmed to the memory cell, which is coupled to one word line, in the memory cell array 401. In another example, the page buffer/sense amplifier 604 may perform a program verify operation to ensure that data has been properly programmed into the memory cells 406 that are coupled to the selected word lines 418. In yet another example, the page buffer/sense amplifier 604 may also sense low power signals from the bit line 416 that represent data bits stored in the memory cells 406, and amplify a small voltage swing to a recognizable logic level during the read operation. The column decoder/bit line driver 606 may be configured to be controlled by the control logic unit 612, and select one or more NAND memory strings 408 by applying a bit line voltage generated from the voltage generator 610.

The row decoder/word line driver 608 may be configured to be controlled by the control logic unit 612, select/unselect the memory blocks 404 of the memory cell array 401, and select/unselect the word lines 418 of the memory blocks 404. The row decoder/word line driver 608 may be further configured to drive the word line 418 using a word line voltage generated from the voltage generator 610, and perform program operations and read operations on the memory cell 406 coupled to the selected word line(s) 418. In some implementations, the row decoder/word line driver 608 may also select/unselect and drive the SSG lines 415 and the DSG lines 413. The voltage generator 610 may be configured to be controlled by the control logic unit 612, and generate the word line voltage (such as, a read voltage, a program voltage, a pass voltage, a local voltage, a verify voltage, etc.), the bit line voltage, and a source line voltage, which are to be supplied to the memory cell array 401.

In some examples, in the memory device, the row decoders are in one-to-one correspondence with the memory blocks 404. In other words, one row decoder corresponds to one memory block, and is configured to parse an address corresponding to each word line in one memory block.

The control logic unit 612 may be coupled to each circuit described above and configured to control the operations of each circuit of the peripheral circuit. The register 614 may be coupled to the control logic unit 612 and include a state register, a command register, and an address register, so as to store state information, command operation code (OP code), and command address for controlling the operations of each peripheral circuit. The interface 616 may be coupled to the control logic unit 612, and act as a control buffer to buffer control commands received from a host (not shown) and relay it to the control logic unit 612, buffer state information received from the control logic unit 612 and relay it to the host. The interface 616 may also be coupled to the column decoder/bit line driver 606 via the data bus 618 and act as a data I/O interface and a data buffer to buffer data and relay it to the memory cell array 401 or to relay or buffer data from the memory cell array 401.

Figure 7:
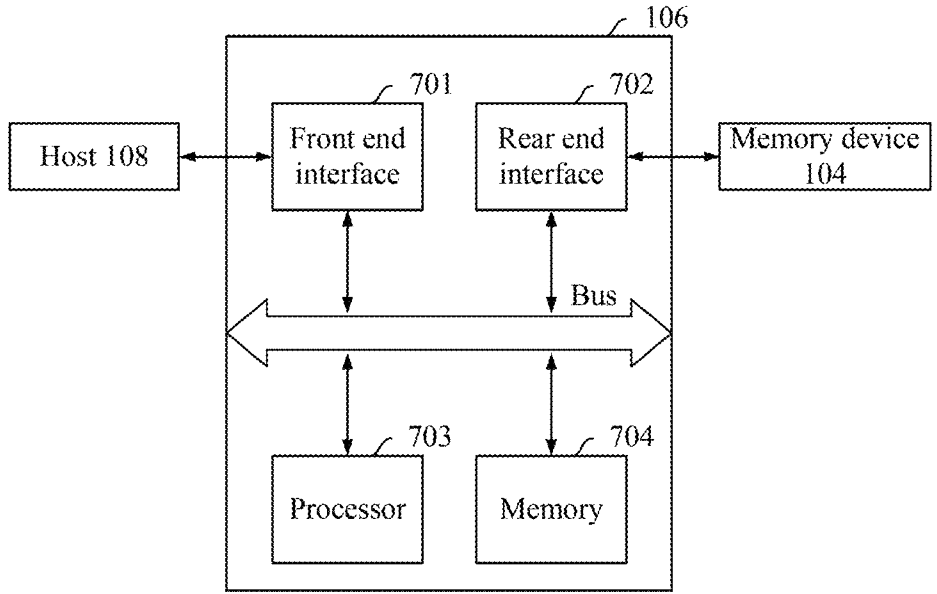
FIG. 7 is a schematic structural diagram of a memory controller provided by examples of the present application.

For the memory controller 106, as shown in FIG. 7, a schematic diagram of an example structure of the memory controller 106 provided by an example of the present application is shown. As shown in FIG. 7, the memory controller 106 may include a front end interface 701, a rear end interface 702, a processor 703 and a memory 704, wherein the above-mentioned components 701, 702, 703 and 704 in the memory controller 106 may share a transmission signal inside the memory controller 106 through an internal bus. In some examples, the front end interface 701 may connect a host with the memory system 102 in response to a protocol of the host coupled with the memory system 102, and the front end interface 701 exchanges a transmission command and a data operation between the host and the memory system 102. The front end interface 701 may process commands and data sent by the host, and may include at least one of the following: a universal serial bus (USB), a multi-media card (MMC), a peripheral component interconnection-express (PCI-e or PCIe), a small computer system interface (SCSI), a serial SCSI (SAS), a serial advanced technology attachment (SATA), a parallel advanced technology attachment (PATA), a small computer system interface (SCSI), an enhanced small disk interface (ESDI), and an integrated drive electronic (IDE). In some examples, the front end interface 701 may include a component of the memory system 102 for exchanging data with the host that may be implemented by firmware called a host interface layer (HIL).

The rear end interface 702 may be an interface for transmitting commands and data between the memory controller 106 and the coupled memory device, allowing the memory controller 106 to control the coupled memory device in response to a request delivered from the host. The rear end interface 702 may generate a control signal for controlling the coupled memory device. In some examples, if the coupled memory device is a NAND flash memory, the rear end interface 702 may write or read data to or from the coupled memory device under the control of the processor 703. The rear end interface 702 may process the commands and data between the memory controller 106 and the coupled memory device, for example, operations of the NAND flash interface, especially operations between the memory controller 106 and the coupled memory device. According to examples, through firmware referred to as a flash interface layer (FIL), the rear end interface 702 may be implemented as the component for exchanging data with the coupled memory device.

The processor 703 may be implemented by a microprocessor or a central processing unit (CPU). The memory system 102 may include one or more processors 703. The processor 703 may control all operations of the memory system 102. By way of example instead of limitation, the processor 703 may control a program operation or a read operation of the coupled memory device in response to a write request or a read request from the host. According to the examples, the processor 703 may use or run a firmware to control all operations of the memory system 102. In the present application, the firmware may include a flash translation layer (FTL). The host may transmit requests related to the write operation and the read operation to the coupled memory device through the FTL. For example, when the operation requested by the host is executed in the coupled memory device, the memory controller 106 uses the processor 703 to process instructions or commands related to the commands from the host. The memory controller 106 may execute, such as a foregrounding operation of a command operation corresponding to the command input from the host, for example, a program operation corresponding to a write command, a read operation corresponding to a read command, an erase/discard operation corresponding to an erase/discard command, and a parameter setting operation corresponding to a setting parameter command or a setting feature command with a setting command.

For another example, the memory controller 106 may execute a background operation on the coupled memory device through the processor 703. By way of example instead of limitation, these background operations may include a garbage collection (GC) operation, a wear leveling (WL) operation, and a bad block management operation to check or search for bad blocks. The garbage collection operation may include an operation of replicating and processing data stored in a memory block in the memory device to another memory block. The wear leveling operation may include an operation of exchanging and processing the stored data between the memory blocks of the memory device. The bad block management operation may include checking and processing bad blocks in the memory blocks of the coupled memory device. The said bad block may refer to a memory block on which no valid data is stored.

The memory 704 may be a work memory of the memory controller 106, and is configured to store data for driving the memory controller 106. When the memory controller 106 controls the memory device in response to a request of the host, the memory 704 may store firmware driven by the processor 703 and data (such as metadata) required for driving the firmware.

The memory 704 may also be a buffer memory of the memory controller 106, and is configured to temporarily store write data transmitted from the host to the coupled memory device, and read data transmitted from the coupled memory device to the host. The memory 704 may include a program memory, a data memory, a write buffer/cache, a read buffer/cache, a data buffer/cache, and a mapping buffer/cache, which are configured for storing the write data and the read data. The memory 704 may be implemented with a volatile memory. The memory 704 may be implemented with at least one of a static random access memory (SRAM) and a dynamic random access memory (DRAM).

Although FIG. 7 shows that the memory 704 is included in the memory controller 106, the present application is not limited thereto. In implementations, the memory 704 may be included outside the memory controller 106, and the memory controller 106 may input and output data to and from the memory 704 through a separate memory interface (not shown). In some examples, a portion of space is divided in the memory by the host and provided to an SSD for use, and the memory controller of the SSD calls a portion of the memory of the host for its own use through the front end interface, i.e. a host memory buffer (HBM) technology.

Based on the memory device, the memory controller and the memory system described above, in some particular application examples, information for indicating the current memory block as a bad block (which is referred to as FBB information for short) is stored in one latch in a row decoder corresponding to the memory block, and a transistor (a circuit structure related to reading/writing the FBB information) matching with the latch and configured for control such as set/reset/sensing and the like is further included around the latch. Such a circuit structure including the latch and the transistor and configured to store the FBB information is present in the row decoder corresponding to each memory block.

In some other examples, the FBB information of the memory block is no longer stored in the row decoder, and instead, the FBB information is stored by a dedicated circuit. Such a design does not require that the latch for storing the FBB information and the circuit structure related to read/write the FBB information are disposed in the row decoder corresponding to each memory block, which can simply the circuit of the row decoder and save the critical area.

Figure 8:
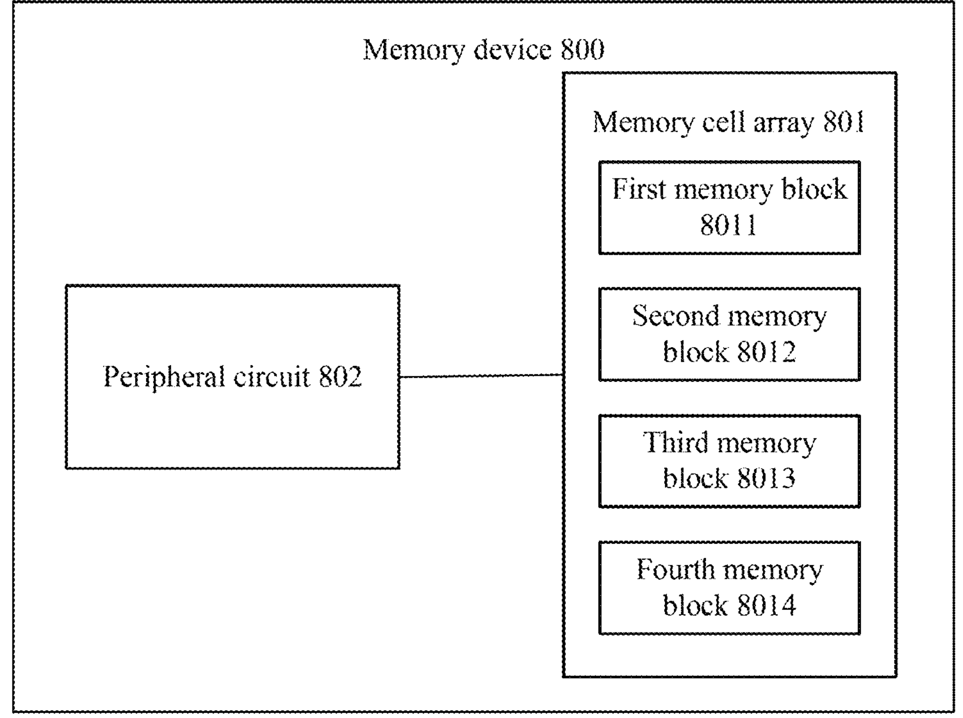
FIG. 8 is a schematic structural diagram of a memory device provided by examples of the present application.

In particular, examples of the present application provide a memory device. As shown in FIG. 8, the memory device 800 includes:

a memory cell array 801 including a first memory block 8011; and a peripheral circuit 802 coupled with the memory block and configured to: receive a first block address information of the first memory block; determine whether the first memory block is a bad block according to the first block address information; generate a first indication signal in response to the first memory block being determined as the bad block; and stop activation of the first memory block pointed to by the first block address information in response to the first indication signal.

It is to be noted that the memory cell array 801 described here may be understood with reference to the memory cell array 401 described above with respect to FIGS. 1 to 7. The first memory block 8011 may also be understood with reference to the memory block 404 described above. The said peripheral circuit 802 and its functions may be understood with reference to the peripheral circuit 402 described above with respect to FIGS. 1 to 7. That is to say, the basic structures and functions of the memory cell array 801 and the peripheral circuit 802 included in the memory device 800 may be understood with reference to the above descriptions of FIGS. 1 to 7, which will be no longer repeated here. The structures and functions of the memory cell array and the peripheral circuit mainly described below are major concerns of the examples of the present application.

In particular, the peripheral 802 is configured to: receive a first block address information of the first memory block; determine whether the first memory block is a bad block according to the first block address information; generate a first indication signal in response to the first memory block being determined as the bad block; and then stop activation of the first memory block in response to the first indication signal. The so-called activation may be understood as selection, that is, when the first memory block is the bad block, in use, the first memory block may be not selected.

In some examples, the said peripheral circuit may be further configured to: compare each of stored at least one piece of reference address information with the first block address information, wherein one piece of the reference address information is configured to point to one bad block in the memory device; generate a first marking signal in response to the first block address information being identical to a first reference address information, wherein the first marking signal is configured to indicate the first memory block as the bad block; and generate the first indication signal in response to the first marking signal.

It is to be noted that the above operations are operations of determining whether the first memory block is the bad block according to the first block address information and generating the first indication signal. In particular, the first block address information is compared with each of the at least one piece of reference address information stored; the first marking signal is generated in response to the first block address information being identical to the first reference address information; and then the first indication signal is generated according to the first marking signal. Here, one piece of reference address information is configured to point to one bad block in the memory device 800. That is to say, the bad blocks of the memory device have been stored, and one bad block corresponds to one piece of reference address information. Thus, if the first block address information input by the user is identical to the first reference address information, the first memory block pointed to by the first block address information is the bad block. In this case, a first marking signal will be generated, and the first marking information is configured to indicate the first memory block as the bad block. The peripheral circuit generates the first indication signal for stopping activation of the first memory block in response to the first marking signal. The first reference address information is one of the at least one piece of reference address information.

In some examples, the peripheral circuit is further configured to: compare each reference bit in each of the at least one piece of reference address information with a corresponding bit in the first block address information; and generate the first marking signal in response to each reference bit in the first reference address information being identical to each corresponding bit in the first block address information.

In particular, each reference bit in each of the at least one piece of reference address information is compared with a corresponding bit in the first block address information, and the first marking signal is generated in response to each reference bit in the first reference address information being identical to each corresponding bit in the first block address information. That is, when the first block address information is determined to be identical to the first reference address information, each bit included in the first block address information needs to be compared with each reference bit included in the first reference address information. The first block address information is determined to be identical to the first reference address information only when each reference bit is identical to the corresponding bit in the first block address information.

In some examples, the memory cell array further includes: at least one redundant memory block for replacing a bad block.

The peripheral circuit is further configured to: determine a block address information pointing to a certain redundant memory block in response to the first memory block being determined as the bad block; and activate the certain redundant memory block to replace the first memory block.

It is to be noted that the memory cell array 801 may further include: at least one redundant memory block for replacing a bad block. With this structure, after the first memory block is determined as the bad block, the peripheral circuit determines the block address information pointing to a certain redundant memory block and activates the certain redundant memory block to replace the first memory block. That is, the redundant memory block is used to replace the first memory block which is the bad block. By operating in this way, directly obtaining an address information pointing to a redundant memory block from a row decoder to activate the redundant memory block may save the processing time.

In some examples, as shown in FIG. 8, the memory cell array includes: a second memory block 8012, wherein the second memory block is one of at least one redundant memory block for replacing a bad block retained in the memory device; and the peripheral circuit is further configured to: generate a first control code in response to the first marking signal; and parse the first control code to obtain a second block address information pointing to the second memory block.

It is to be noted that the second memory block is one of the at least one redundant memory block described above. It will be appreciated that before the memory device is put into use, the number of bad blocks included in the memory device and a correspondence relationship between address information corresponding to a bad block and a memory block for replacing a bad block may be set in advance. In this case, when the first memory block is determined as the bad block, in addition to generating the first indication signal to stop activation of the first memory block described above, the first control code may be further generated according to the first marking signal; and then the first control code is parsed to obtain the second block address information pointing to the second memory block for use to activate the second memory block. The second memory block is one redundant memory block configured for replacing the first memory block which is the bad block.

The first memory block and the second memory block may belong to the same memory plane. That is to say, in the same plane, redundant memory blocks for replacement are disposed for bad blocks included therein. For example, Plane0 includes one bad block Block0, and one replacing redundant memory block Block1 is disposed for Block0 in Plane0.

The first memory block and the second memory block may also not belong to the same memory plane. That is, redundant memory blocks for replacement disposed for bad blocks included in a certain plane are in another plane. For example, Plane0 includes one bad block Block0, and one replacing redundant memory block Block0 or other memory block is disposed for Block0 in Plane1.

It is to be noted that the foregoing are merely two examples, and a positional relationship of the first memory block and the second memory block in the memory cell array may not be limited.

In some examples, as shown in FIG. 8, the memory cell array further includes: a third memory block 8013; and the peripheral circuit is further configured to: receive a third block address information of the third memory block; determine whether the third memory block is a bad block according to the third block address information; generate a second indication signal in response to the third memory block being determined as the bad block; and stop activation of the third memory block pointed to by the third block address information in response to the second indication signal.

It is to be noted that the third memory block is a memory block different from the first memory block in the memory cell array. In an example, the third memory block and the first memory block may be in the same memory plane. In another example, the third memory block and the first memory block may not be in the same memory plane. It is to be described here that, the peripheral circuit can determine whether different memory blocks are bad block, and when a certain memory block is determined as the bad block, generate a marking signal for indicating the memory block as the bad block for later user. Positions of the first memory block and the third memory block in the memory cell array may not be limited.

In particular, after the third block address information is received, the peripheral circuit may be further configured to: determine whether the third memory block is the bad block according to the third block address information, and generate the second indication signal when the third memory block is determined as the bad block; and then stop activation of the third memory block in response to the second indication signal.

In some examples, the peripheral circuit may be further configured to: compare each of the at least one piece of reference address information with the third block address information, and generate a second marking signal in response to the third block address information being identical to a second reference address information, wherein the second marking signal is configured to indicate the third memory block as the bad block; and generate the second indication signal in response to the second marking signal.

Likewise, when determining whether the third memory block is a bad block according to the third block address information, the third block address information may be compared with at least one piece of reference address information stored, and the second marking signal is generated when the second reference address information being identical to the third block address information; and then the second indication signal is generated according to the second marking signal. In particular, each bit in the third block address information may be compared with a corresponding reference bit in each of the at least one piece of reference address information stored to determine whether the third block address information is identical to one certain piece of reference address information of the at least one piece of reference address information. The second reference address information may be one of the at least one piece of reference address information.

In some examples, as shown in FIG. 8, the memory cell array further includes: a fourth memory block 8014, wherein the fourth memory block is one of at least one redundant memory block for replacing a bad block retained in the memory device; and the peripheral circuit is further configured to: generate a second control code in response to the second marking signal; and parse the second control code to obtain a fourth block address information pointing to the fourth memory block.

Similarly, when the third memory block is determined as the bad block, the peripheral circuit further generates the second control code in response to the second marking signal, and parses the second control code to obtain the fourth block address information pointing to the fourth memory block, and then activates the fourth memory block pointed to by the fourth block address information to replace the third memory block.

The memory device provided by the examples of the present application compares the received block address information of the memory block with the at least one piece of reference address information stored to determine whether the memory block to be used is the bad block and stops activation of the memory block to be used when the memory block to be used is determined as the bad block. Further, by determining the address information of the redundant memory block for replacing the memory block to be used, the redundant memory block for replacing the bad block may be activated to replace the bad block, thereby saving time. The memory device provided by the examples of the present application may also determine whether the corresponding memory block is the bad block by determining the block address information of different memory blocks with the at least one piece of reference address information stored, and then perform some operations. That is, the memory device provided by the examples of the present application may share a set of the at least one piece of reference address information stored and a determination circuit for determining whether a memory block is a bad block. Based on this idea, some circuit area may be saved in the design of the memory device.

Figure 9:
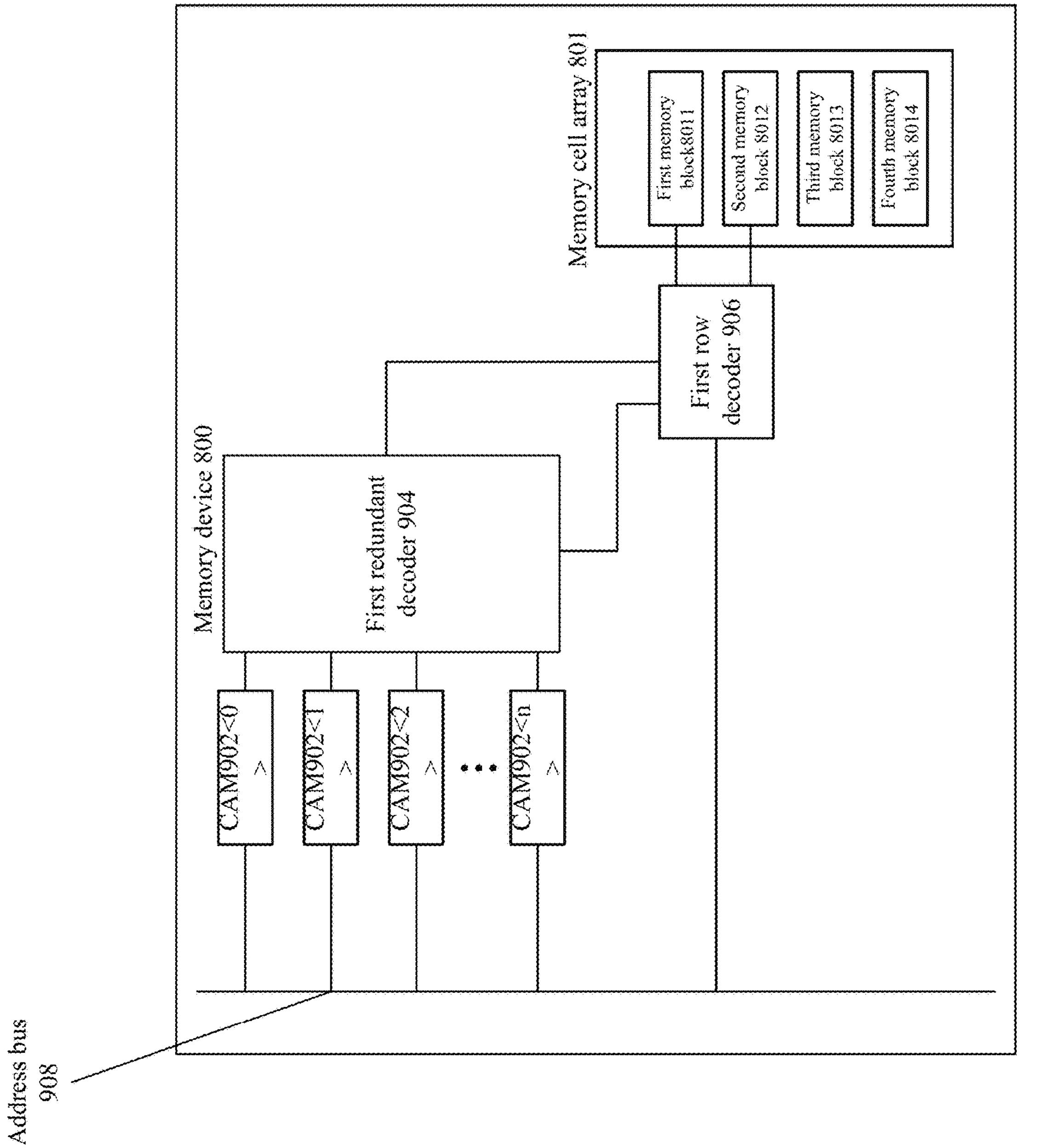
FIG. 9 is another schematic structural diagram of a memory device provided by examples of the present application.

In particular, based on the above inventive concept, examples of the present application further provide a schematic structural diagram of a peripheral circuit of an example memory device 800. As shown in FIG. 9, the memory device 800 includes:

a memory cell array 801 including a first memory block 8011; and at least one content addressable memory (CAM) 902, wherein an input end of each CAM is input with a first block address information of the first memory block; when first reference address information stored in a first CAM is identical to the first block address information, an output end of the first CAM outputs a first marking signal; the first marking signal is configured to indicate the first memory block as a bad block; and the first CAM is one of the at least one CAM;

a first redundant decoder 904, wherein each input end of the first redundant decoder is connected with an output end of one of the at least one CAM; a first output end of the first redundant decoder outputs a first indication signal in response to the first marking signal output by the first CAM; and a first row decoder 906, wherein a first input end of the first row decoder is input with the first block address information, and a second input end of the first row decoder is connected with an output end of the first redundant decoder; a first output end of the first row decoder outputs a first stop signal in response to the first indication signal, wherein the first stop signal is configured to stop activation of the first memory block pointed to by the first block address information.

It is to be noted that the memory device shown in FIG. 9 is merely an example of the memory device shown in FIG. 8. The structure of the peripheral circuit is described in detail in FIG. 9. However, it is to be noted that FIG. 9 only illustrates a structure of interest in the present application in the peripheral circuit, and other necessary structures may also be as shown as in FIG. 6.

In particular, the said at least one CAM 902 may include CAM902<0>, CAM902<1>, CAM902<2>, . . . , and CAM902<n> as shown in FIG. 9, wherein the number n is related to the number of redundant memory blocks disposed in the memory device.

The memory device shown in FIG. 9 may operate as follows: a first block address signal is input through an address bus 908, and first block address information is transmitted into CAM902<0>, CAM902<1>, CAM902<2>, . . . , and CAM902<n>, and to a first row decoder. On the one hand, each CAM, after receiving the first block address information, compares it with reference address information stored by itself. When the reference address information (e.g., first reference address information) stored in a certain CAM (e.g., a first CAM) is identical to the first block address information, the CAM (i.e., the first CAM) outputs a first marking signal and sends the first marking signal to a first redundant decoder. After receiving the first marking signal, the first redundant decoder outputs a first indication signal to a first row decoder in response to the first marking signal. The first row decoder receives the first indication signal, and outputs a first stop signal in response to the first indication signal to stop activation of a first memory block. It is to be noted that in the memory device shown in FIG. 9, the first row decoder is a row decoder corresponding to the first memory block, and while the CAM is input with the first block address information, the first row decoder also is input with the first block address information. It should be appreciated that while the CAM and the first redundant decoder work, the first row decoder parses the first block address information, and activates the first memory block pointed to by the parsed address, and only when receiving the first indication signal, stops activation of the first memory block.

The first CAM may include:

at least one latch, wherein one reference bit in the first reference address information is stored in each latch;

at least one comparator, wherein a first input end of each comparator is input with the reference bit stored in the corresponding latch, a second input end of each comparator is input with a corresponding bit in the first block address information, and an output end of each comparator outputs a comparison result; and a second redundant decoder, wherein each input end of the second redundant decoder is input with the comparison result output by one comparator; and an output end of the second redundant decoder outputs the first marking signal in response to each comparison result including that the reference bit in the first reference address information is identical to the corresponding bit in the first block address information.

Figure 10:
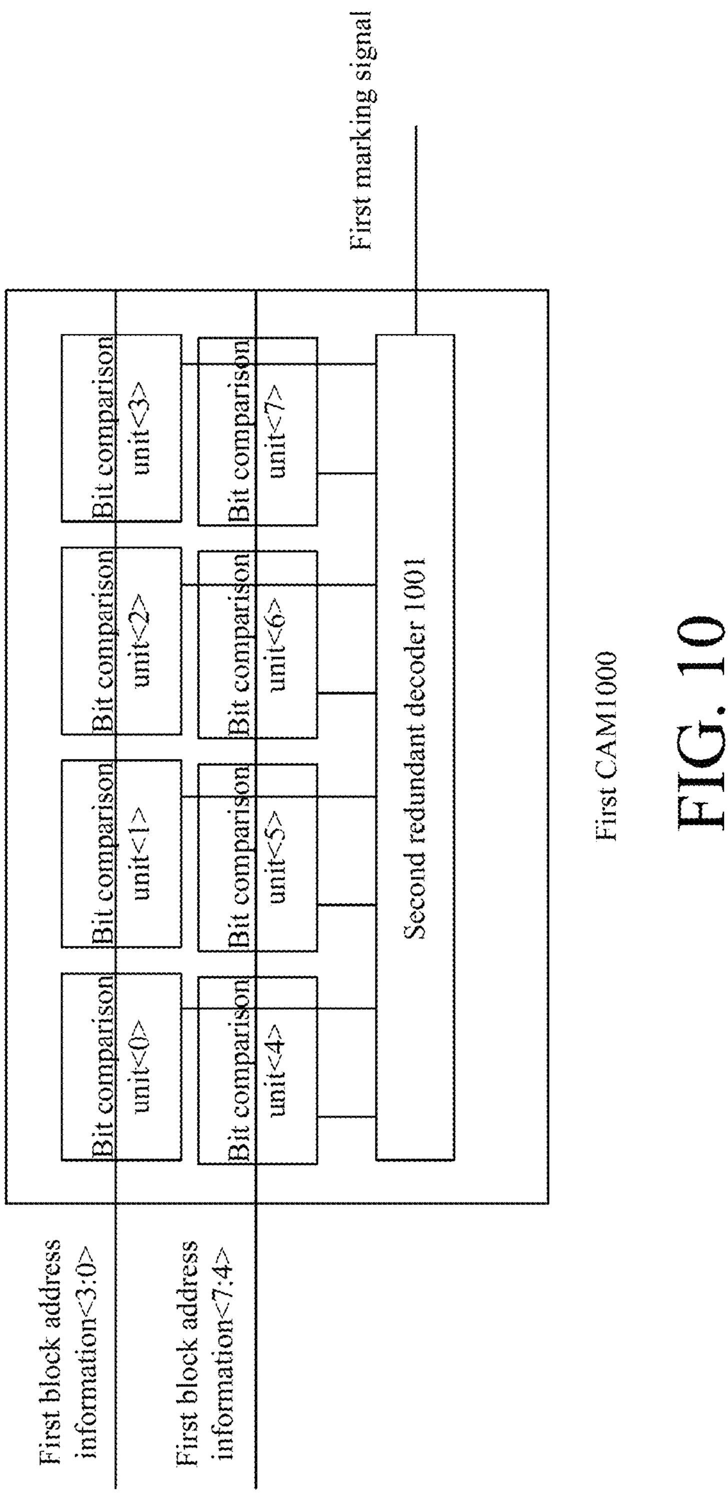
FIG. 10 is a schematic structural diagram of a CAM provided by examples of the present application.

The first CAM 1000, in an example, as shown in FIG. 10, may include: a bit comparison unit <0>, a bit comparison unit <1>, a bit comparison unit <2>, . . . , and a bit comparison unit <8>, wherein each bit comparison unit stores one reference bit in the first reference address information, and a corresponding bit in the first block address information is input to an input end of each bit comparison unit, and an output end of each bit comparison unit outputs a comparison result of the reference bit in the first reference address information and the corresponding bit in the first block address information.

Each input end of the second redundant decoder 1001 is input with one comparison result; and an output end of the second redundant decoder outputs the first marking signal in response to each comparison result including that the reference bit in the first reference address information is identical to the corresponding bit in the first block address information.

It is to be noted that the said bit comparison unit may also be referred to as CAM_UNIT, and the number of the bit comparison units is decided by the bits included in the first block address information. For example, if the first block address information is BA<7:0> and includes 8 bits, as shown in FIG. 10, the number of CAM_UNITs included is 8.

Each bit comparison unit includes one latch and one comparator. The latch stores one reference bit in the first reference address information. A first input end of the comparator is input with the reference bit stored by the corresponding latch, and a second input end of the comparator is input with the corresponding bit in the first block address information, and an output end of the comparator outputs a comparison result of the reference bit and the corresponding bit.

The number of the comparators is equal to the number of the latches, and the number of the comparators and the number of the latches are both identical to the number of bits included in the first block address information.

Figure 11:
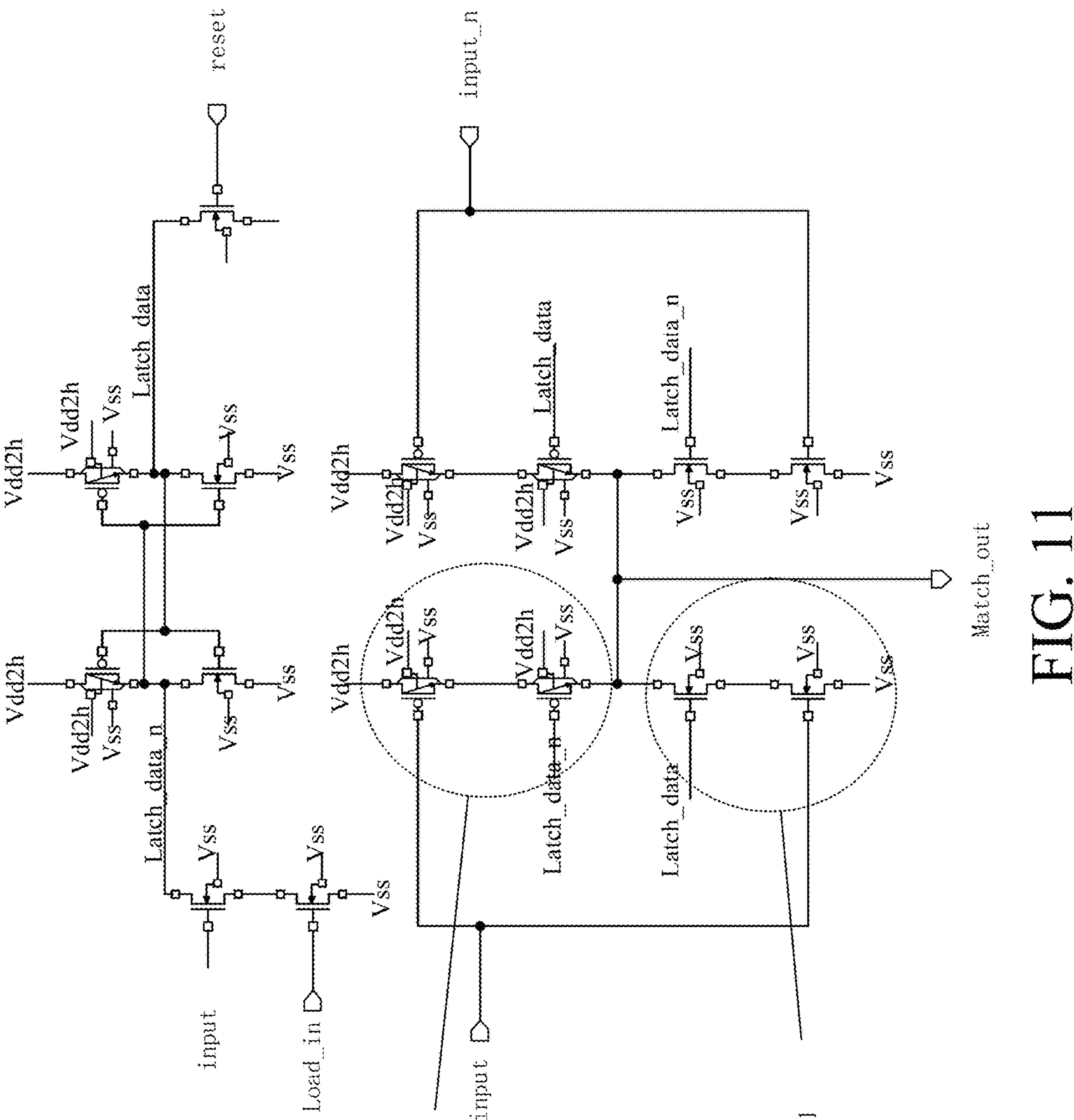
FIG. 11 is a schematic structural diagram of a bit comparison unit in a CAM provided by examples of the present application.

For example, an implementation circuit of CAM_UNIT is as shown in FIG. 11. The CAM_UNIT circuit includes a 1-bit latch and a match logic circuit (i.e., the comparator) for comparison with a reference bit stored by the latch. It is to be noted that in FIG. 11, latch_data represents a temporarily stored reference bit; and latch_data_n represents inversion of the reference bit. For example, when latch_data is 1, latch_data_n is 0. The top half of the circuit diagram of FIG. 11 is the circuit of the latch, and the circuit of the bottom half is the circuit of the comparator. Input is the corresponding bit in the first block address information, and input_n is inversion of the corresponding bit in the first block address information. Match_out is the comparison result of the reference bit and the corresponding bit. When the reference bit is identical to the corresponding bit, a potential of Match_out is pulled down. The first marking signal is inversion of each Match_out.

The working principle of the circuit shown in FIG. 11 is as follows: the process for the temporarily stored reference bit of the top half may be as follows: with load_in of 1, when input is 1, latch_data_n is pulled down to 0, and a pulling up P transistor of an inverter is turned on and N transistor is turned off, and latch_data is set to 1, i.e., stores reference bit 1. When reset is high, it can be clear that latch_data data is 0. Here, input is a particular value of the reference bit.

The comparison process for the bottom half may be as follows: Match_out may be at a high level by default. The address information inputs 1 from input, and when latch_data is 1, the two match, and the closed circuit in block 1 pulls Match_out down from the high level. The first marking signal is inversion of each Match_out. That is, when Match_out is low, the first marking signal is at a high level. On the contrary, if input is 0, when latch_data is 1, the two do not match, and the closed circuit in block 2 maintains Match_out at a high level continuously, and the first marking signal is thus at a low level.

In some examples, as shown in FIG. 9, the memory cell array 801 may further include: a second memory block 8012 for replacing the first memory block when the first memory block becomes the bad block.

A second output end of the first redundant decoder 904 outputs a first control code in response to the first marking signal output by the first CAM; wherein the first control code is configured to point to the second memory block.

A third input end of the first row decoder 906 is connected with the second output end of the first redundant decoder, and a second output end of the first row decoder outputs a second block address information, wherein the second block address information is an address information which is obtained by parsing the first control code and points to the second memory block.

It is to be noted that here described is a process in which the redundant memory block, when present, may be utilized to replace the memory block which is the bad block. That is, when the first CAM outputs the first marking signal, the second output end of the first redundant decoder outputs the first control code. The first control code is a string of code pointing to the second memory block. The first row decoder can obtain the second block address information which may point to the second memory block by parsing the first control code.

Here, the first redundant decoder may have two functions: one is to generate the first indication signal in response to the first marking signal such that the first row decoder stops activation of the first memory block in response to the first indication signal; and the other one is to generate the first control code in response to the first marking signal such that the first row decoder parses the first control code to obtain the second block address information pointing to the second memory block and activates the second memory block according to the second block address information. It is to be noted that before the memory device is used, a relationship between a bad block and a redundant memory block may be set in advance, and the first redundant decoder stores this relationship such that a bad block and a redundant memory block may be associated, thereby allowing for replacement. The first redundant decoder may be implemented by registers or a circuit structure, which will not be defined here.

In some examples, the number of CAMs in the at least one CAM is equal to the number of redundant memory blocks for replacing bad blocks retained in the memory device, wherein the second memory block is one of the redundant memory blocks.

It is to be noted that the memory device has been inspected before leaving the factory, and there is a limitation on the number of bad blocks; otherwise, the memory device is a non-conforming product. Therefore, there is also a limitation on the number of redundant memory blocks; otherwise, user capacity cannot be guaranteed. In this case, the number of CAMs may be set to be consistent with the number of redundant memory blocks.

Figure 12:
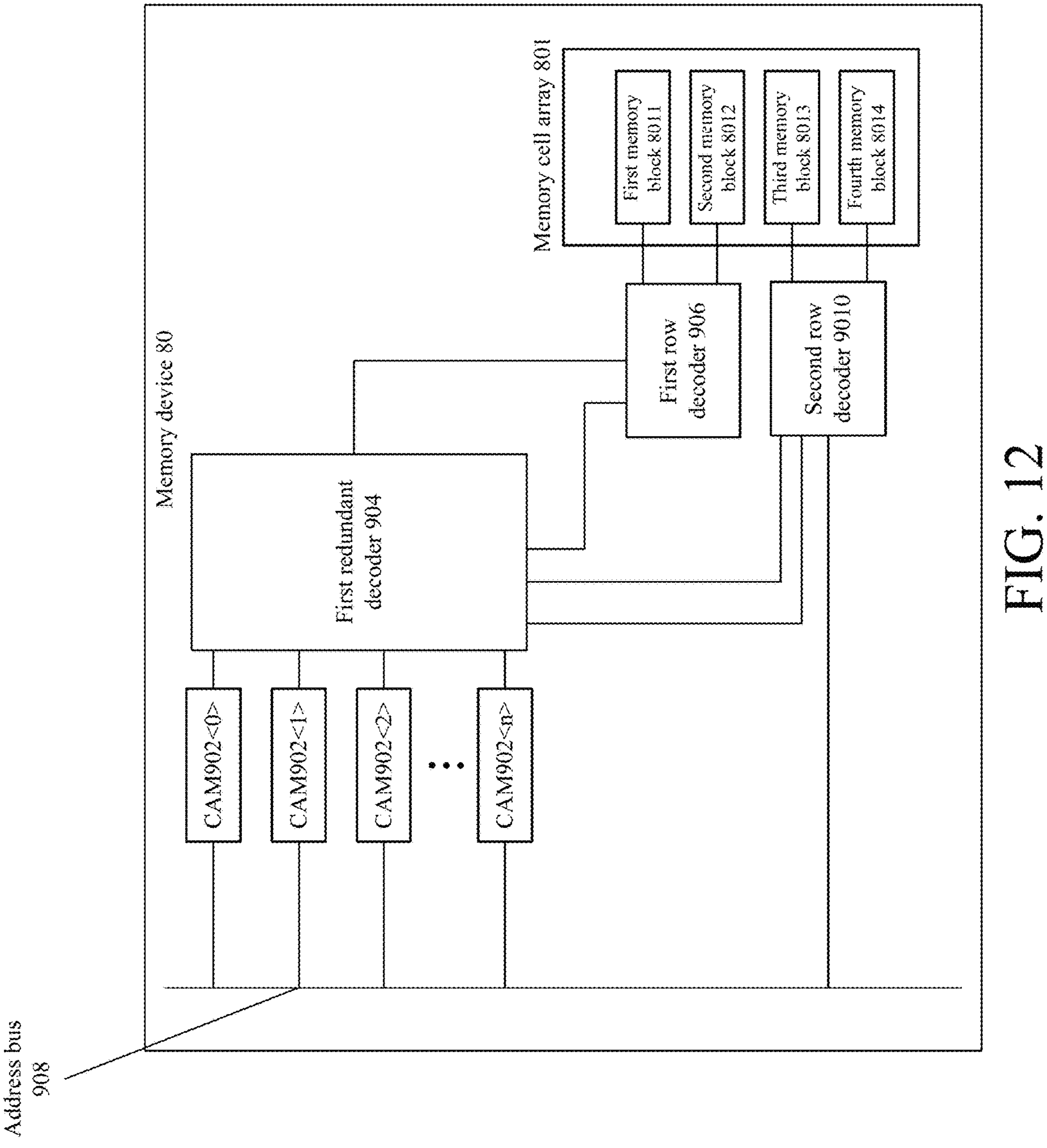
FIG. 12 is yet another schematic structural diagram of a memory device provided by examples of the present application.

In some examples, as shown in FIG. 12, the memory cell array further includes: a third memory block; and the memory device further includes: a second row decoder 9010.

The input end of each CAM 902 of the at least one CAM is input with a third block address information of the third memory block; when the second reference address information stored in a second CAM is identical to the third block address information, an output end of the second CAM outputs a second marking signal, wherein the second marking signal is configured to indicate the third memory block as a bad block, and the second CAM is one of the at least one CAM.

The first output end of the first redundant decoder 904 outputs a second indication signal in response to the second CAM outputs the second marking signal.

A first input end of the second row decoder 9010 is input with the third block address information, and a second input end of the second row decoder is connected with the output end of the first redundant decoder; a first output end of the second row decoder outputs a second stop signal in response to the second indication signal; and the second stop signal is configured to stop activation of the third memory block pointed to by the third block address information.

It is to be noted that the second row decoder is a row decoder corresponding to the third memory block. That is to say, the at least one CAM and the first redundant decoder are shared. When each CAM is input with the third block address information, if the second reference address information stored in the second CAM is identical to the third block address information, the second CAM outputs the second marking signal. The first redundant decoder is input with the second marking signal, and generates the second indication signal in response to the second marking signal. The second row decoder is input with the second indication signal, and outputs the second stop signal in response to the second indication signal to stop activation of the third memory block.

In some examples, as shown in FIG. 12, the memory cell array may further include: a fourth memory block 8014 for replacing the third memory block when the third memory block becomes the bad block.

The second output end of the first redundant decoder outputs a second control code in response to the second marking signal output by the second CAM, wherein the second control code is configured to point to the fourth memory block.

A third input end of the second row decoder is connected with the second output end of the first redundant decoder, and a second output end of the second row decoder outputs a fourth block address information; and the fourth block address information is an address information pointing to the fourth memory block obtained by parsing the second control code.

It is to be noted that the fourth memory block may be one of the redundant memory blocks and is configured to replace the third memory block. In particular, the first redundant decoder is input with the second marking signal, and outputs the second control code in response to the second marking signal. Here, the second control code is similar to the first control code described above, and may be understood with reference to the above and will be no longer described. The second row decoder is input with the second control code, parses the second control code to obtain the fourth block address information pointing to the fourth memory block, and activates the fourth memory block according to the fourth block address information.

The memory device provided by the examples of the present application records the information of different bad blocks and processes the input address information corresponding to a bad block, and stops activates the bad block and/or activates the replacing redundant memory block, by disposing at least one CAM and first redundant decoder that are common. With such a design, a plurality of memory blocks share one set of storage and processing circuits for the FBB information of bad blocks, thereby saving the circuit area and reducing the cost. Moreover, the circuit area in the row decoder is saved; and a pressure caused by the size of a word line driven gate along an X axis direction in the memory device may be reduced (the size of the word line driven gate may be designed better according to a requirement; for example, in some places, the size of the word line driven gate is large, and in this case, the size of the row decoder is small; and the size of the word line driven gate may be large, which will not be limited). Moreover, by using the storage and processing manners of the FBB information provided by the examples of the present application, the storage forms of the FBB information are increased (only the address information of a bad block may be stored). As such, the FBB information may be stored more flexibly. Moreover, the method provided by the examples of the present application can realize bad blk replacement inside a NAND chip without the aid of an external piloting control, but is also compatible with an previous bad block management function. In addition, the area occupied by key parts around the memory array is saved so that the die size can be possibly reduced or more other functional circuits can be added.

Figure 13:
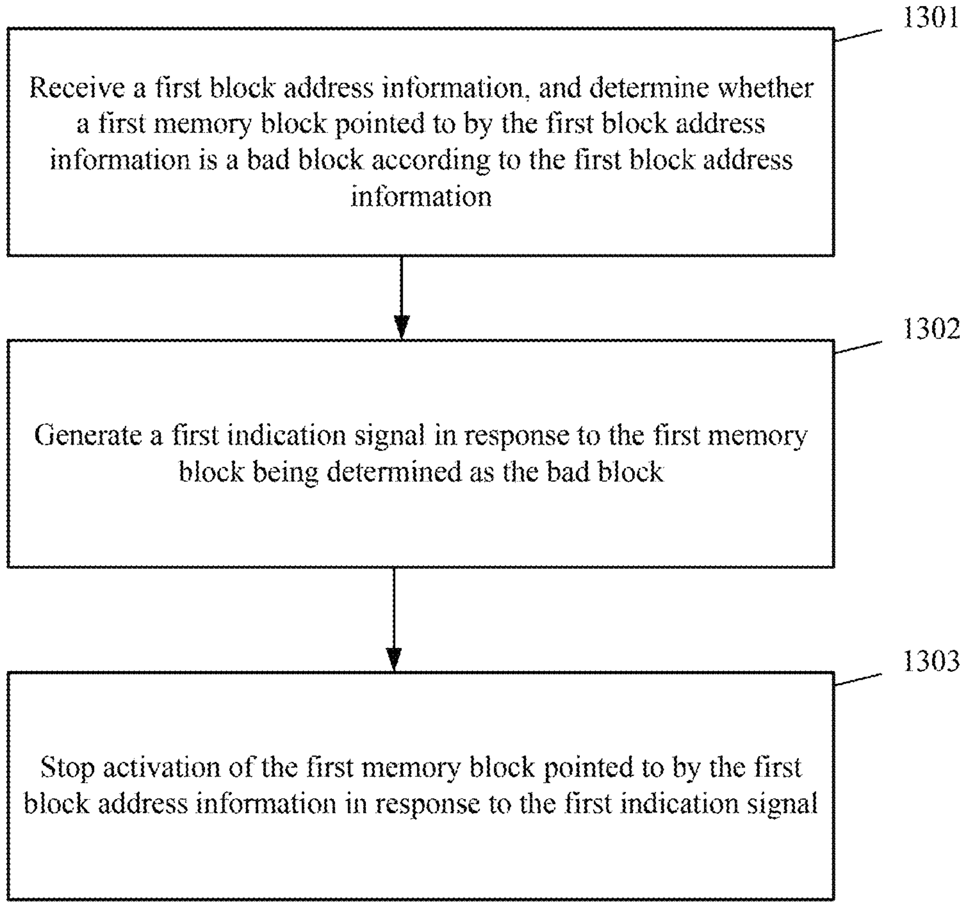
FIG. 13 is a flow diagram of an operating method of a memory device provided by examples of the present application.

Based on the same inventive concept, examples of the present application further provide an operating method of a memory device, as shown in FIG. 13, which may include:

- operation 1301: receiving first block address information, and determining whether a first memory block pointed to by the first block address information is a bad block according to the first block address information;
- operation 1302: generating a first indication signal in response to the first memory block being determined as the bad block; and
- operation 1303: stopping activation of the first memory block pointed to by the first block address information in response to the first indication signal.

In some examples, the method may further include: determining a second block address information in response to the first memory block being determined as the bad block; and activating a second memory block pointed to by the second block address information to replace the first memory block, wherein the second memory block is one of at least one redundant memory block for replacing a bad block retained in the memory device.

In some examples, the determining whether the first memory block pointed to by the first block address information is the bad block according to the first block address information may include: comparing each of stored at least one piece of reference address information with the first block address information, wherein one piece of the reference address information is configured to point to one bad block in the memory device; and generating a first marking signal in response to the first block address information being identical to first reference address information, wherein the first marking signal is configured to indicate the first memory block as the bad block.

In some examples, the comparing each of the stored at least one piece of reference address information with the first block address information may include: comparing each reference bit in each of the at least one piece of reference address information with a corresponding bit in the first block address information.

The generating the first marking signal in response to the first block address information being identical to the first reference address information may include: generating the first marking signal in response to each reference bit in the first reference address information being identical to each corresponding bit in the first block address information.

In some examples, the determining the second block address information may include: generating a first control code in response to the first memory block being determined as the bad block; and parsing the first control code to obtain the second block address information pointing to the second memory block.

In some examples, the method may further include: receiving a third block address information, and determining whether the third memory block pointed to by the third block address information is a bad block according to the third block address information; generating a second indication signal in response to the third memory block being determined as the bad block; and stopping activation of the third memory block pointed to by the third block address information in response to the second indication signal.

In some examples, the method may further include: comparing each of the at least one piece of reference address information with the third block address information, and generating a second marking signal in response to the third block address information being identical to a second reference address information, wherein the second marking signal is configured to indicate the third memory block as the bad block; and generating the second indication signal in response to the second marking signal.

In some examples, the method may further include: generating a second control code in response to the second marking signal; and parsing the second control code to obtain a fourth block address information pointing to a fourth memory block, wherein the fourth memory block is one of at least one redundant memory block for replacing a bad block retained in the memory device.

It is to be noted that the operating method is based on the memory device provided by the foregoing examples of the present application, wherein the technical features appearing in the descriptions of the operating method have been described in detail when the memory device is described above, and may be understood with reference to the above, and will be no longer repeated here.

Examples of the present application further provide a memory system, which may include: the memory device described above; and a memory controller coupled with the memory device and configured to control the memory device.

In some examples, the memory system is included in a solid state drive (SSD) or a memory card.

It is to be noted that the memory system provided by the examples of the present application includes the contents described above with respect to FIGS. 8 to 12, and therefore, in order to save space, the particular structure of the memory system may be known with reference to the memory device and the memory controller described above, and will be no longer repeated here.

According to examples of the present application, a memory device is provided, including: a memory cell array including: a first memory block; and a peripheral circuit coupled with the first memory block and configured to: receive a first block address information of the first memory block; determine whether the first memory block is a bad block according to the first block address information; generate a first indication signal in response to the first memory block being determined as the bad block; and stop activation of the first memory block pointed to by the first block address information in response to the first indication signal.

In the above solution, the memory cell array further includes: at least one redundant memory block for replacing a bad block; and the peripheral circuit is further configured to: determine block address information pointing to a certain redundant memory block in response to the first memory block being determined as the bad block; and activate the certain redundant memory block to replace the first memory block.

In the above solution, the peripheral circuit is further configured to: compare each of stored at least one piece of reference address information with the first block address information, wherein one piece of the reference address information is configured to point to one bad block in the memory device; generate a first marking signal in response to the first block address information being identical to first reference address information, wherein the first marking signal is configured to indicate the first memory block as the bad block; and generate the first indication signal in response to the first marking signal.

In the above solution, the peripheral circuit is further configured to: compare each reference bit in each of the at least one piece of reference address information with a corresponding bit in the first block address information; and generate the first marking signal in response to each reference bit in the first reference address information being identical to each corresponding bit in the first block address information.

In the above solution, the memory cell array includes: a second memory block, wherein the second memory block is one of at least one redundant memory block for replacing a bad block retained in the memory device; and the peripheral circuit is further configured to: generate a first control code in response to the first marking signal; and parse the first control code to obtain a second block address information pointing to the second memory block.

In the above solution, the memory cell array further includes: a third memory block; and the peripheral circuit is further configured to: receive a third block address information of the third memory block; determine whether the third memory block is a bad block according to the third block address information; generate a second indication signal in response to the third memory block being determined as the bad block; and stop activation of the third memory block pointed to by the third block address information in response to the second indication signal.

In the above solution, the peripheral circuit is further configured to: compare each of the at least one piece of reference address information with the third block address information, and generate a second marking signal in response to the third block address information being identical to a second reference address information, wherein the second marking signal is configured to indicate the third memory block as the bad block; and generate the second indication signal in response to the second marking signal.

In the above solution, the memory cell array includes: a fourth memory block, wherein the fourth memory block is one of at least one redundant memory block for replacing a bad block retained in the memory device; and the peripheral circuit is further configured to: generate a second control code in response to the second marking signal; and parse the second control code to obtain a fourth block address information pointing to the fourth memory block.

In the above solution, the first memory block and the third memory block belong to the same memory plane.

In the above solution, the first memory block and the third memory block are not in the same memory plane.

In the above solution, the first memory block and the second memory block belong to the same memory plane.

In the above solution, the first memory block and the second memory block belong to the same memory plane.

According to examples of the present application, a memory device is provided, including: a memory cell array including a first memory block;

at least one content addressable memory (CAM), wherein an input end of each CAM is input with a first block address information of the first memory block; when a first reference address information stored in a first CAM is identical to the first block address information, an output end of the first CAM outputs a first marking signal; the first marking signal is configured to indicate the first memory block as a bad block; and the first CAM is one of the at least one CAM;

a first redundant decoder, wherein each input end of the first redundant decoder is connected with an output end of one of the at least one CAM; a first output end of the first redundant decoder outputs a first indication signal in response to the first marking signal output by the first CAM; and a first row decoder, wherein a first input end of the first row decoder is input with the first block address information, and a second input end of the first row decoder is connected with an output end of the first redundant decoder; a first output end of the first row decoder outputs a first stop signal in response to the first indication signal, wherein the first stop signal is configured to stop activation of the first memory block pointed to by the first block address information.

In the above solution, the memory cell array further includes: a second memory block for replacing the first memory block when the first memory block becomes the bad block;

a second output end of the first redundant decoder outputs a first control code in response to the first marking signal output by the first CAM, wherein the first control code is configured to point to the second memory block; and a third input end of the first row decoder is connected with the second output end of the first redundant decoder, and a second output end of the first row decoder outputs a second block address information, wherein the second block address information is an address information which is obtained by parsing the first control code and points to the second memory block.

In the above solution, a number of CAMs in the at least one CAM is equal to a number of redundant memory blocks for replacing bad blocks retained in the memory device, wherein the second memory block is one of the redundant memory blocks.

In the above solution, the first CAM includes:

at least one latch, wherein one reference bit in the first reference address information is stored in each latch;

at least one comparator, wherein a first input end of each comparator is input with the reference bit stored in the corresponding latch, a second input end of each comparator is input with a corresponding bit in the first block address information, and an output end of each comparator outputs a comparison result; and a second redundant decoder, wherein each input end of the second redundant decoder is input with the comparison result output by one comparator; and an output end of the second redundant decoder outputs the first marking signal in response to each comparison result including that the reference bit in the first reference address information is identical to the corresponding bit in the first block address information.

In the above solution, a number of the comparators is equal to a number of the latches, and the number of the comparators and the number of the latches are both identical to a number of bits included in the first block address information.

In the above solution, the memory cell array further includes: a third memory block; the memory device further includes: a second row decoder;

the input end of each of the at least one CAM is input with a third block address information of the third memory block; when a second reference address information stored in a second CAM is identical to the third block address information, an output end of the second CAM outputs a second marking signal, wherein the second marking signal is configured to indicate the third memory block as a bad block, and the second CAM is one of the at least one CAM;

a first redundant decoder, a first output end of the first redundant decoder outputs a second indication signal in response to the second CAM outputs the second marking signal;

the second row decoder, a first input end of the second row decoder is input with the third block address information, and a second input end of the second row decoder is connected with a output end of the first redundant decoder; a first output end of the second row decoder outputs a second stop signal in response to the second indication signal; and the second stop signal is configured to stop activation of the third memory block pointed to by the third block address information.

In the above solution, the memory cell array further includes: a fourth memory block for replacing the third memory block when the third memory block becomes the bad block;

a second output end of the first redundant decoder outputs a second control code in response to the second marking signal output by the second CAM, wherein the second control code is configured to point to the fourth memory block; and a third input end of the second row decoder is connected with the second output end of the first redundant decoder, and a second output end of the second row decoder outputs a fourth block address information; and the fourth block address information is an address information pointing to the fourth memory block obtained by parsing the second control code.

According to examples of the present application, an operating method of a memory device is provided, including:

receiving a first block address information, and determining whether a first memory block pointed to by the first block address information is a bad block according to the first block address information;

generating a first indication signal in response to the first memory block being determined as the bad block; and stopping activation of the first memory block pointed to by the first block address information in response to the first indication signal.

In the above solution, the method further includes:

determining a second block address information in response to the first memory block being determined as the bad block; and activating a second memory block pointed to by the second block address information to replace the first memory block, wherein the second memory block is one of at least one redundant memory block for replacing a bad block retained in the memory device.

In the above solution, the determining whether the first memory block pointed to by the first block address information is the bad block according to the first block address information includes:

comparing each of stored at least one piece of reference address information with the first block address information, wherein one piece of the reference address information is configured to point to one bad block in the memory device; and generating a first marking signal in response to the first block address information being identical to a first reference address information; the first marking signal is configured to indicate the first memory block as the bad block.

In the above solution, the comparing each of the stored at least one piece of reference address information with the first block address information includes:

comparing each reference bit in each of the at least one piece of reference address information with a corresponding bit in the first block address information; and the generating the first marking signal in response to the first block address information being identical to the first reference address information includes:

generating the first marking signal in response to each reference bit in the first reference address information being identical to each corresponding bit in the first block address information.

In the above solution, the determining the second block address information includes: generating a first control code in response to the first memory block being determined as the bad block; and parsing the first control code to obtain the second block address information pointing to the second memory block.

In the above solution, the method further includes:

receiving a third block address information, and determining whether a third memory block pointed to by the third block address information is a bad block according to the third block address information;

generating a second indication signal in response to the third memory block being determined as the bad block; and stopping activation of the third memory block pointed to by the third block address information in response to the second indication signal.

In the above solution, the method further includes:

comparing each of the at least one piece of reference address information with the third block address information, and generating a second marking signal in response to the third block address information being identical to a second reference address information, wherein the second marking signal is configured to indicate the third memory block as the bad block; and generating the second indication signal in response to the second marking signal.

In the above solution, the method further includes: generating a second control code in response to the second marking signal; and parsing the second control code to obtain a fourth block address information pointing to a fourth memory block, wherein the fourth memory block is one of at least one redundant memory block for replacing a bad block retained in the memory device.

According to examples of the present application, a memory system is provided, including: the memory device of any one of the above-mentioned examples; and a memory controller coupled with the memory device and configured to control the memory device.

In the above solution, the memory system is included in a solid state drive (SSD) or a memory card.

The examples of the present application provide a memory device, an operating method, and a memory system. The memory device includes: a memory cell array, the memory cell array including: a first memory block; and a peripheral circuit coupled with the first memory block and configured to: receive a first block address information of the first memory block; determine whether the first memory block is a bad block according to the first block address information; generate a first indication signal in response to the first memory block being determined as the bad block; and stop activation of the first memory block pointed to by the first block address information in response to the first indication signal. The memory device provided by the examples of the present application may determine whether a memory block to be operated is a bad block and stops activation of the memory block when the memory block to be operated is determined as the bad block.

The above descriptions are only examples of the present application, and are not configured to limit the protection scope of the present application.

What is claimed is:

1. A memory device, comprising:

a memory cell array including: a first memory block; and a peripheral circuit coupled with the first memory block and configured to:

receive a first block address information of the first memory block;

determine whether the first memory block is a bad block according to the first block address information;

generate a first indication signal in response to the first memory block being determined as the bad block; and stop an activation of the first memory block pointed to by the first block address information in response to the first indication signal.

2. The memory device of claim 1, wherein the memory cell array further includes: at least one redundant memory block for replacing a bad block; and the peripheral circuit is further configured to: determine a block address information pointing to a certain redundant memory block in response to the first memory block being determined as the bad block; and activate the certain redundant memory block to replace the first memory block.

3. The memory device of claim 1, wherein the peripheral circuit is further configured to:

compare each of stored at least one piece of reference address information with the first block address information, wherein one piece of the reference address information is configured to point to one bad block in the memory device;

generate a first marking signal in response to the first block address information being identical to a first reference address information, wherein the first marking signal is configured to indicate the first memory block as the bad block; and generate the first indication signal in response to the first marking signal.

4. The memory device of claim 3, wherein the peripheral circuit is further configured to:

compare each reference bit in each of the at least one piece of reference address information with a corresponding bit in the first block address information; and generate the first marking signal in response to each reference bit in the first reference address information being identical to each corresponding bit in the first block address information.

5. The memory device of claim 3, wherein the memory cell array includes: a second memory block, wherein the second memory block is one of at least one redundant memory block for replacing a bad block retained in the memory device; and the peripheral circuit is further configured to: generate a first control code in response to the first marking signal; and parse the first control code to obtain a second block address information pointing to the second memory block.

6. The memory device of claim 3, wherein the memory cell array further includes: a third memory block; and the peripheral circuit is further configured to:

receive a third block address information of the third memory block;

determine whether the third memory block is a bad block according to the third block address information;

generate a second indication signal in response to the third memory block being determined as the bad block; and stop activation of the third memory block pointed to by the third block address information in response to the second indication signal.

7. The memory device of claim 6, wherein the peripheral circuit is further configured to:

compare each of the at least one piece of reference address information with the third block address information, and generate a second marking signal in response to the third block address information being identical to a second reference address information, wherein the second marking signal is configured to indicate the third memory block as a bad block; and generate the second indication signal in response to the second marking signal.

8. The memory device of claim 7, wherein the memory cell array includes: a fourth memory block, wherein the fourth memory block is one of at least one redundant memory block for replacing a bad block retained in the memory device; and the peripheral circuit is further configured to:

generate a second control code in response to the second marking signal; and parse the second control code to obtain a fourth block address information pointing to the fourth memory block.

9. An operating method of a memory device, the operating method comprising:

receiving a first block address information, and determining whether a first memory block pointed to by the first block address information is a bad block according to the first block address information;

generating a first indication signal in response to the first memory block being determined as the bad block; and stopping an activation of the first memory block pointed to by the first block address information in response to the first indication signal.

10. The method of claim 9, further including:

determining a second block address information in response to the first memory block being determined as the bad block; and activating a second memory block pointed to by the second block address information to replace the first memory block, wherein the second memory block is one of at least one redundant memory block for replacing a bad block retained in the memory device.

11. The method of claim 9, wherein the determining whether the first memory block pointed to by the first block address information is the bad block according to the first block address information includes:

comparing each of stored at least one piece of reference address information with the first block address information, wherein one piece of the reference address information is configured to point to one bad block in the memory device; and generating a first marking signal in response to the first block address information being identical to a first reference address information, wherein the first marking signal is configured to indicate the first memory block as the bad block.

12. The method of claim 11, wherein the comparing each of the stored at least one piece of reference address information with the first block address information includes:

comparing each reference bit in each of the at least one piece of reference address information with a corresponding bit in the first block address information; and the generating the first marking signal in response to the first block address information being identical to first reference address information includes:

generating the first marking signal in response to each reference bit in the first reference address information being identical to each corresponding bit in the first block address information.

13. The method of claim 10, wherein the determining the second block address information includes:

generating a first control code in response to the first memory block being determined as the bad block; and parsing the first control code to obtain the second block address information pointing to the second memory block.

14. The method of claim 9, wherein the first memory block is stored in a memory cell array and the memory cell array includes:

at least one redundant memory block for replacing thee bad block; and the method includes:

determining a block address information pointing to a certain redundant memory block in response to the first memory block being determined as the bad block; and activating the certain redundant memory block to replace the first memory block.

15. A non-transitory computer readable medium comprising instructions to cause programmable circuitry to:

determine whether a first memory block pointed to by a first block address information is a bad block according to the first block address information;

generate a first indication signal in response to the first memory block being determined as the bad block; and stop an activation of the first memory block pointed to by the first block address information in response to the first indication signal.

16. The non-transitory computer readable medium of claim 15, wherein the instructions cause the programmable circuitry to:

determine a second block address information in response to the first memory block being determined as the bad block; and activate a second memory block pointed to by the second block address information to replace the first memory block, wherein the second memory block is one of at least one redundant memory block for replacing a bad block.

17. The non-transitory computer readable medium of claim 16, wherein the instructions cause the programmable circuitry to determine the second block address information by:

generating a first control code in response to the first memory block being determined as the bad block; and parsing the first control code to obtain the second block address information pointing to the second memory block.

18. The non-transitory computer readable medium of claim 15, wherein the instructions cause the programmable circuitry to determine whether the first memory block pointed to by the first block address information is the bad block according to the first block address information by:

comparing each of stored at least one piece of reference address information with the first block address information, wherein one piece of the reference address information is configured to point to one bad block; and generating a first marking signal in response to the first block address information being identical to a first reference address information, wherein the first marking signal is configured to indicate the first memory block as the bad block.

19. The non-transitory computer readable medium of claim 18, wherein the instructions cause the programmable circuitry to compare each of the stored at least one piece of reference address information with the first block address information by:

comparing each reference bit in each of the at least one piece of reference address information with a corresponding bit in the first block address information; and the generating the first marking signal in response to the first block address information being identical to first reference address information includes:

generating the first marking signal in response to each reference bit in the first reference address information being identical to each corresponding bit in the first block address information.

20. The non-transitory computer readable medium device of claim 15, wherein the first memory block is stored in a memory cell array and the memory cell array includes:

at least one redundant memory block for replacing thee bad block; and wherein the instructions cause the programmable circuitry to:

determine a block address information pointing to a certain redundant memory block in response to the first memory block being determined as the bad block; and activate the certain redundant memory block to replace the first memory block.

* * * * *